UNITED STATES PATENT OFFICE.

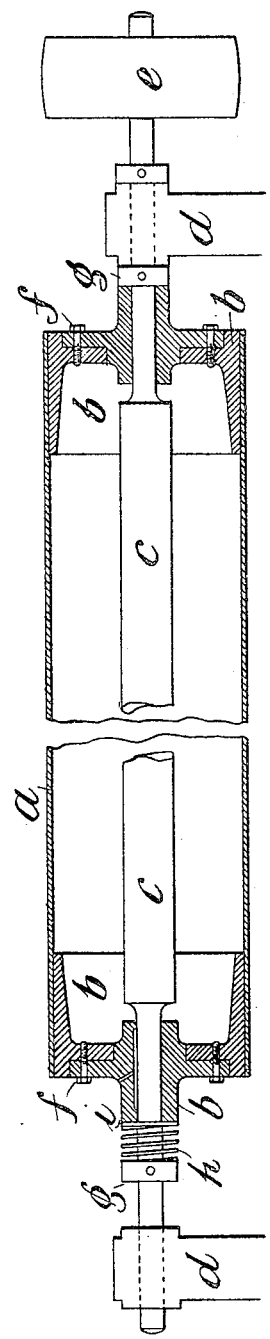

SAMUEL MILNE, OF EDINBURGH, SCOTLAND.

ROLL OF PAPER-MAKING MACHINES.

No. 800,464. Specification of Letters Patent. Patented Sept. 26, 1905.

Application filed December 12, 1903. Serial No. 184,972.

*To all whom it may concern:*

Be it known that I, SAMUEL MILNE, a subject of the King of Great Britain and Ireland, and a resident of Edinburgh, Scotland, have invented certain new and useful Improvements in or Relating to the Rolls of Paper-Making Machines and the Like, of which the following is a specification.

This invention relates chiefly to the leading-rolls of paper-making machines, but is capable of application to the breast, wire, and felt rolls of such machines; and its object is so to mount the said rolls and impart rotary motion thereto that they will vary their speeds automatically with the taut or slack condition of the material passing over them—*i. e.*, rotate at the normal speed of the paper or other material passing over them when such material is taut, increase their speed to take up slack when slack occurs, and after taking up the slack again rotate at the said normal speed without putting undue strain on the material.

To this end the invention consists, essentially, in driving the rolls frictionally instead of positively and driving them nominally at a speed slightly exceeding that of the material passing over them, the friction being such as to allow of a slip or retardation of the roll when requiring to rotate at the speed of the material and sufficient to rotate the roll at a quicker speed when the material becomes slack.

The invention may be carried out in various ways; but the accompanying drawings show one of the simplest examples and as applied to the leading-roll of a paper-making machine.

Figure 1 illustrates a longitudinal section of the roll, and Fig. 2 illustrates a modified detail to which reference is hereinafter made.

In Fig. 1 the roll comprises the shell $a$, and the end bearing-bushes $b$. These bushes are bored plain and loosely fit the spindle $c$, which in turn is mounted at each end in the usual bearings $d$. Fast upon the spindle is the driving-pulley $e$, by which and a belt the spindle is driven at a speed slightly in excess of that of the paper passing over the roll. The motion thus imparted to the spindle is conveyed to the roll by reason only of the friction of the bushes $b$ on the spindle due to the weight of the roll, and the friction is of such a character that when unrestricted by the material passing over it the roll is rotated at its full speed, while when restricted it rotates only at a speed allowed by the paper without putting any strain thereon. In practice it is found that the best results are obtained if the diameter of the spindle $c$ where it supports the bushes is the same diameter as the usual bearings $d$. With such diameter, however, insufficient to allow the spindle to properly support the roll the spindle requires to be of larger diameter or to be otherwise stiffened within the roll, as shown. To allow for the introduction and withdrawal of the spindle thus enlarged, the bushes are each made in two parts detachably secured to each other by set-bolts $f$ or other suitable means. To hold the roll against endwise movement, also to increase the friction between it and the spindle, it may be provided at both ends with a fixed collar $g$ and at one or both ends with a spring $h$ and washer $i$, this latter being pressed against the end of the bush by the spring, and the roll being pressed against the collar $g$ at the opposite end. In lieu of a collar fixed by a pin a nut or set of nuts $j$ may be employed, screwing onto a screwed part of the spindle or a fixed sleeve thereon and adjustable against the spring $h$, as shown in Fig. 2.

Although only showing one way of carrying out my invention, it will be obvious that it is capable of being applied in other ways, by friction-disks or by swivel, conical, or ball bearings or the like, the main requirement being to employ a part which is driven at a speed slightly in excess of the paper and drive the roll from such part by friction, the friction being such as to allow for the roll to have its motion retarded or increased in the manner described. It will also be seen that the invention is applicable to the breast, wire, felt, and other rolls of paper-making machines, also to the rolls of other kinds of machines, such as printing-machines, textile machines, winding-machines, as well as to rolls and drums generally requiring to have their speed controlled by the material passing over or around them, while at the same time relieving the material of the strain necessary to drive such rolls or drums.

What I claim is—

1. A roll, rotary supporting means therefor, fixed bearings for the said supporting means, and driving means for the said supporting means, this latter being driven at a speed slightly in excess of the speed of the material passing over the roll when at its full tension, and the manner in which the roll is mounted on the said supporting means being such as to enable it to be rotated solely by the friction between it and the said supporting means, and the friction being such as to allow the roll to rotate at the speed of the material passing over it when at its full tension, and at a quicker speed when the material is not at its full tension, as set forth.

2. In combination, a spindle, a roll with end bushes frictionally mounted on the said spindle, and means for positively driving the said spindle at a speed slightly in excess of the speed of the material passing over the roll, the friction between the spindle and the roll being such as to allow the speed of the roll to be retarded or accelerated according to the taut or slack condition of the material, as set forth.

3. In combination, a cylindrical metal shell forming a roll, end bearing-bushes for each end of said shell in two parts, and bolts for fastening the two parts of each bush together, a shaft with enlarged central part within the shell, and said shaft passing at its narrower parts loosely through said bearing-bushes, collars fixed on the shaft for holding the bearing-bushes against endwise movements, a spring and washer between one bearing-bush and one of the collars for producing a frictional drag on the rotary movements of the shell, substantially as set forth.

In witness whereof I have hereunto set my hand in the presence of two witnesses.

SAMUEL MILNE. [L. S.]

Witnesses:
 GEORGE FINDLAY,
 FREDERICK PIATT.